Figure 1:
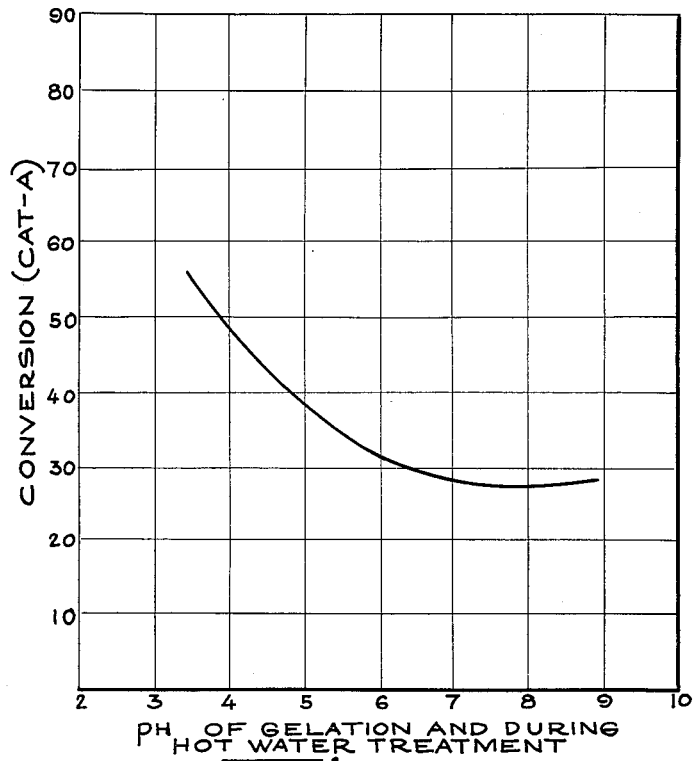

3,137,658
PREPARATION OF A SILICA-ZIRCONIA CATALYST FOR CONVERSION OF HYDROCARBONS
Leonard C. Drake, Woodbury, Charles J. Plank, Wenonah, Edward J. Rosinski, Almonesson, and Robert B. Smith, Glassboro, N.J., assignors to Socony Mobil Oil Company, Inc., a corporation of New York
Filed Jan. 12, 1959, Ser. No. 786,167
10 Claims. (Cl. 252—452)

This invention relates to the catalytic conversion of hydrocarbons. More particularly, the present invention is concerned with hydrocarbon conversion catalysts and to an improved silica-zirconia catalyst and with a method of preparing the same. Such catalyst have been found to be useful in various hydrocarbon conversion processes, especially in the cracking of heavy petroleum oils to produce lighter materials boiling in the gasoline range.

It has heretofore been known to produce catalytic composites of silica and zirconia in accordance with various methods. Thus, it has been proposed to prepare silica-zirconia catalysts by impregnation of silica gel with zirconium nitrate and to subsequently decompose the metal salt to zirconia. Molded mixtures of silica and zirconia precipitates have also been suggested as hydrocarbon conversion catalysts. While the results obtained utilizing such catalysts have indicated that composites of silica and zirconia are useful in catalytically promoting the conversion of hydrocarbons, the activity of the catalysts prepared by the foregoing method has not been of significant commercial interest as compared with available silica-alumina hydrocarbon conversion catalysts as to constitute any appreciable improvement over the latter. Accordingly, the industry has continued to use as petroleum cracking catalysts, composites of silica and alumina of a natural or synthetic origin.

The present invention affords a silica-zirconia catalyst characterized by outstanding selectivity and activity in the conversion of hydrocarbons. The improvement arises from the method of preparation which comprises a particular combination of procedural steps including the reaction of a water-soluble zirconium compound and a silicate selected from the group consisting of an alkali metal silicate and an organic silicate ester in such proportion as to yield a gelable hydrosol having a zirconia content, on a dry solids basis, of between about 2 and about 20 percent by weight and a pH of below 6, permitting the resulting sol to set to a gel, contacting the gel so obtained with liquid water at a temperature in the approximate range of 150 to 220° F. for at least about 5 hours and up to 72 hours under conditions of substantially atmospheric pressure, removing zeolitic impurities from the hot water treated gel, washing the gel free of water-soluble matter, drying and calcining. In the foregoing procedure, it has been found that the hot water treating step and control of the pH during gelation and the hot water treatment are essential in achieving the unusually effective selectivity and activity characterizing the present silica-zirconia catalyst. It has further been found that not only is the hot-water treating step essential, but that also the conditions required during this step to obtain the desired catalyst selectivity are very critical. This, the pH during the hot water treating step is essentially below 6 and preferably below 5. The temperature of such treatment is essentially carried out at above about 150° F. and preferably above 175° F. for at least about 5 hours and preferably at least about 12 hours.

Without being limited by any theory, it would appear that the above specified conditions of formation and after-treatment of the silica-zirconia gel are essential in achieving the proper degree of interaction between the silica and zirconia components. Thus, it is believed that the original composite of silica and zirconia is merely a mixture of silica particles and relatively large zirconia particles and that it is necessary to de-polymerize the zirconia particles and spread them more uniformly through the silica matrix in order to obtain a multitude of active interface catalytic sites. It is postulated that during the reaction of the zirconium and silicate compounds, the following type of interaction occurs:

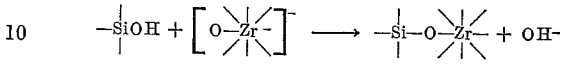

The above postulation would fit the findings of the present invention in that zirconium is preferably in the anion form; a low pH is desirable to react with the OH⁻ produced and a high temperature facilitates depolymerization of the polymeric zirconium anion. It is accordingly believed that in accordance with the present invention, conditions of formation and after-treatment of a silica-zirconia gel have been discovered which favor the above-indicated interaction giving rise to an improved silica-zirconia composite useful in the catalytic conversion of hydrocarbons.

The zirconium compound employed in the present process is a water-soluble compound and suitably a water-soluble mineral acid salt of zirconium such as for example, zirconium nitrate, zirconium sulfate and zirconyl chloride. Of this group, zirconium sulfate is accorded preference, since under comparable conditions of formation, catalysts prepared using this salt showed the greatest improvement in activity and selectivity.

The silicate reactant is generally an alkali metal silicate and particularly sodium silicate, although silicates of the other alkali metals, such as, for example, potassium silicate might likewise be employed. An organic silicate ester, for example ethyl ortho silicate, may also be employed, as the source of silica.

The solutions of zirconium compound and silicate reactant are intimately mixed in such proportions as to yield a gelable sol having a zirconia content, on a dry solids basis, of between about 2 and about 20 and preferably between about 5 and about 15 percent by weight and a pH of below 6, and preferably in the approximate range of 1.5 to 5.

In order to achieve the above-indicated pH control over the reaction between the zirconium compound and silicate, the reaction mixture is supplemented by a predetermined quantity of another material of low pH. Such material may be an acid or an acid salt. Generally, an inorganic acid and particularly a mineral acid such as nitric, sulfuric or hydrochloric acid will be employed for this purpose. The acidic material may be added to either or both of the reactant solutions before admixture of the same. When an acid, such as sulfuric acid is used, the desired amount of acid is advantageously mixed with the zirconium compound before the latter is contacted with the silicate reactant.

The resulting product is a hydrosol of silica and zirconia characterized by an inherent capacity to set to a hydrogel upon lapse of a suitable interval of time, extending from a few seconds up to several hours depending on pH, temperature and solids concentration, without addition to or subtraction from the hydrosol of any substance. The silica-zirconia hydrogel so obtained is thereafter treated, suitably in particle-form, with hot water.

The hot water treating step, as noted above, is critical in achieving the improved silica-zirconia composite of this invention. In accordance with such step, the hydrogel is covered with liquid water and maintained therein at a temperature of between about 150° F. and about 220° F. and preferably between about 175° F. and about 220° F. for a period of at least 5 hours and preferably at least 12 hours which period may extend up to about 72 hours. The pH of the hydrogel during hot water treatment is an important factor having a direct bearing on the ultimate catalyst activity. For example, variation in the extent of catalytic conversion as determined by the CAT-A test described hereinbelow with the pH of the hydrogel during gelation and hot water treatment is illustrated in FIG. 1 of the attached drawing. Reference to this figure will show that the pH of the hydrogel is suitably less than 6 and preferably less than 5 in order to obtain high activity.

After hot water treatment, exchangeable or zeolitic impurities are removed from the hydrogel in any feasible manner. Thus, for base-exchange; aqueous solutions of mineral acids such as hydrochloric and sulfuric acids may be employed; solutions of ammonium salts which act to replace metal impurities with ammonium which is later removed by calcining; and solutions of multivalent metal salts; particularly a zirconium salt which may be the same or a different zirconium salt from that employed in initial formation of the hydrogel. When base-exchanging the silica-zirconia hydrogel with an acid, a limited and controlled amount must obviously be used to avoid redissolving the zirconia. When exchanging with ammonium compounds any excesses will be calcined out in the final steps of catalyst manufacture and when using any zirconium or other multivalent metal salt excesses may be used and left on the composite.

After removal of zeolitic impurities, the hydrogel is water washed free of soluble excess ions. The resulting catalytic composite of silica and zirconia is then completed according to conventional methods by drying in air or superheated steam at a temperature between about 200 and 400° F. for a period of between about 4 and 24 hours and/or by calcining at a temperature between about 800 and about 1800° F. for approximately 2 to 8 hours or more. The catalyst may be prepared in any desired mechanical form according to the specific purpose for which it is intended. Either before or after calcination, it can be broken into lumps or granules, or it can be ground to a fine powder adapted for use in the suspensoid or fluidized-solids processes. Alternatively, the catalyst can be formed into pills, pellets, or other suitable shapes, preferably prior to the calcination step for use in fixed bed or compact moving bed operations. In this case, the catalytic mixture is partially dried, ground to a powder preferably smaller than 30 mesh (Tyler), combined with a suitable lubricant such as graphite, hydrogenated coconut oil, stearic acid, rosin or the like and shaped by extrusion, molding or by other means known in the art. Particles having dimensions ranging from about 1/8" x 1/8" to 1/2" x 1/2" are generally satisfactory. The shaped particles can then be further dried and/or calcined as described above.

The resulting improved silica-zirconia catalyst is useful in numerous processes for the conversion of hydrocarbons. It has been found, for example, to be highly effective in the cracking of heavy petroleum oils, such as gas oils, heavy naphthas and the like to lighter materials boiling in the gasoline range at conventional catalytic cracking conditions including temperatures in the range of about 800 to 1050° F. and pressure ordinarily between 1 and 5 atmospheres absolute. The present catalyst is also suitable for use in various other hydrocarbon conversion reactions.

The following examples will serve to illustrate the invention hereinabove described without limiting the same:

EXAMPLE 1

A catalyst of silica and zirconia was produced from the following reactants:

Solution A which was prepared by adding 690 cc. of diluted "N" brand sodium silicate containing 0.193 gram $SiO_2$/cc. to 730 cc. of water.

Solution B which was prepared by adding 300 cc. of $Zr(SO_4)_2 \cdot 4H_2O$ solution containing 0.05 gram $ZrO_2$/cc. and 51 cc. $H_2SO_4$ (48.85 weight percent aqueous solution) to 729 cc. of water.

Solutions A and B were mixed quickly with rapid mechanical agitation. The resulting hydrosol had a pH of 3.6. Gelation to a firm hydrogel occurred in about 4-6 hours at a room temperature of about 75° F.

The resulting firm hydrogel was cut into cubes and transferred to containers wherein the cubes were covered with water and maintained at a temperature of 175° F. for 24 hours.

The hot water treated hydrogel was then base-exchanged to remove zeolitic impurities by contacting with a 2 weight percent aqueous solution of ammonium chloride involving three 2-hour treatments and one overnight treatment, employing approximately one volume of ammonium chloride solution per volume of gel for each treatment.

The base-exchanged hydrogel was then washed with water until substantially free of chloride ion, dried overnight at 280° F. and calcined overnight at 1000° F.

The following example shows the necessity of the hot water treating step:

EXAMPLE 2

A catalyst was prepared in a manner analogous to that of Example 1 with one exception. Instead of hot water treating the hydrogel at 175° F. for 24 hours, the hydrogel in this case was exposed to superheated steam at 266° F. for 7 hours. The hydrogel was dry at the end of about 3 hours. The resulting dried hydrogel was base-exchanged, water-washed, dried and calcined as in Example 1.

Cracking properties of the above catalysts were measured by the CAT-A test described on page R-537, National Petroleum News, Technical Section, August 2, 1944. In this test, as an index of activity, the volume percent of gasoline (410° F. end point) produced from the charge is measured, as well as the weight percent of coke deposited on the catalyst. The relative cracking properties of the catalysts of Examples 1 and 2 are shown in Table I below:

Table I

| | CAT-A Results | | |
|---|---|---|---|
| | Conversion, Vol. percent | Gasoline, Vol. percent (410° F.) | Coke, Wt. percent |
| Example 1 | 53.0 | 45.2 | 3.8 |
| Example 2 | 56.8 | 48.0 | 4.8 |

From the above data, it is evident that under otherwise identical preparational conditions, hot water treatment of the hydrogel, as specified, prior to base-exchange gives a catalyst which produces much less coke than one obtained upon drying the hydrogel with steam prior to the base-exchange step.

After a mild steam treatment, the catalyst of Example 1 is not only much more active than that of Example 2, but it is also more selective as shown by the comparative results obtained upon subjecting each of the catalysts to the CAT-C test. In this test, a Wide Range Mid-Continent Gas Oil, boiling initially from 450° F. to 95 percent at 950° F., is passed over the catalyst sample at a standard set of conditions involving a liquid hourly space velocity of 2, a catalyst to oil ratio of 3, and a temperature of 900° F. To observe selectively differences independent of the conversion level of the individual silica-zirconia catalyst samples, each catalyst is compared to a standard commercial silica-alumina cracking catalyst containing about 10 weight percent alumina and 90 weight percent silica, giving the same conversion as the appropriate silica-zirconia catalyst. The results for Examples 1 and 2 are set forth in Table II. In this comparison, each of the catalysts were treated with 100 percent steam for 10 hours at atmospheric pressure at 1200° F. before the cracking test to bring the activity to a reproducible level.

Table II

|  | Conversion, Vol. percent | 10# Gasoline Vol. percent | Coke, Wt. percent |
|---|---|---|---|
| Example 1 | 60.0 | 50.8 | 3.6 |
| Silica-Alumina | 60.0 | 45.9 | 4.5 |
| Example 2 | 33.7 | 28.7 | 2.9 |
| Silica-Alumina | 33.7 | 30.2 | 1.4 |

From the above data, it is evident that while the catalyst of Example 1 (with hot water treatment) gave more gasoline and less coke than silica-alumina catalyst under identical conditions of conversion, the catalyst of Example 2 (without hot water treatment) gave less gasoline and more coke than comparable silica-alumina catalyst. In addition, as will be noted, the catalyst of Example 1 is far more stable to the action of steam.

Another pair of silica-zirconia catalysts (Examples 3 and 4) was prepared to show the necessity of hot water treatment.

EXAMPLE 3

In this example the following reactants were employed:
Solution A consisting of 700 cc. of diluted "N" brand sodium silicate containing 0.193 gram $SiO_2$/cc.

Solution B which was prepared by adding 300 cc. of $Zr(SO_4)_2 \cdot 4H_2O$ solution containing 0.05 gram $ZrO_2$/cc. and 57 cc. of $H_2SO_4$ (50 weight percent aqueous solution) to 1500 cc. of water.

Solutions A and B were mixed quickly with rapid mechanical agitation. The resulting hydrosol had a pH of 3.5. Gelation to a firm hydrogel occurred in about 4–5 hours at a room temperature of about 75° F.

The resulting firm hydrogel was cut into cubes and transferred to containers wherein the cubes were covered with water and maintained at a temperature of 175° F. for 24 hours.

The hot water treated hydrogel was then base-exchanged to remove zeolitic impurities by contacting with a 1 percent weight aqueous solution of zirconium sulfate involving three 2-hour treatments and one overnight treatment, employing approximately one volume of zirconium sulfate solution per volume of gel for each treatment.

The base-exchanged hydrogel was then washed with water until substantially free of sulfate ion, dried overnight at about 280° F. and calcined overnight at 1000° F.

EXAMPLE 4

A silica-zirconia catalyst was prepared in a manner identical with that of Example 3 except that no hot water treating step was involved.

The above catalysts of Examples 3 and 4 were tested for cracking properties in an unsteamed condition utilizing the aforementioned CAT-C test. The catalysts were compared in an unsteamed condition because after steaming the catalyst which had not undergone hot water treatment (Example 4) had no detectable cracking activity. The data are shown in Table III below:

Table III

|  | Conversion, Vol. Percent | 10# Gasoline, Vol. Percent |
|---|---|---|
| Example 3 | 68.2 | 48.6 |
| Example 4 | 31.6 | 22.1 |

The superiority of the catalyst of Example 3 which had been hot water treated in the hydrogel stage during formation over that of Example 4 which had not undergone the specified hot water treatment is clearly evident.

Two series of silica-zirconia catalysts were prepared by methods analogous to that used in preparation of the catalyst of Example 1. In the first series (Examples 5–8) the only variation was in the time of hot water treating at 175° F. In the second series (Examples 9–13) the silica-zirconia catalysts were hot water treated for 24 hours at different temperatures. After steaming the catalyst samples at 10 hours in 100 percent steam at 1200° F. and 15 p.s.i.g., these catalysts were then tested for catalytic cracking characteristics in the CAT-C test. As above, the results for each catalyst were compared against results obtained with a standard commercial silica-alumina catalyst (containing 90 weight percent silica and 10 weight percent alumina) at the same conversion level. The differences in activity, as measured by the difference in volume percent of gasoline obtained, between the above silica-zirconia catalysts and silica-alumina are shown in Tables IV and V below:

Table IV

TIME OF HOT WATER TREATING AT 175° F.

| Example | Hrs. Hot $H_2O$ Treat | Conversion, Vol. Percent | Difference from $SiO_2$-$Al_2O_3$* Gasoline, Vol. Percent |
|---|---|---|---|
| 5 | 4 | 42.2 | +0.6 |
| 6 | 7 | 44.9 | +2.0 |
| 7 | 24 | 46.8 | +1.8 |
| 8 | 48 | 47.7 | +3.1 |

Table V

TEMPERATURE IF HOT WATER TREAT (24 HRS.)

| Example | Temp., ° F. | Conversion, Vol. Percent | Difference from $SiO_2$-$Al_2O_3$* Gasoline, Vol. Percent |
|---|---|---|---|
| 9 | 100 | 41.7 | +0.1 |
| 10 | 120 | 44.4 | +1.2 |
| 11 | 150 | 47.2 | +1.2 |
| 12 | 175 | 46.8 | +1.8 |
| 13 | 200 | 48.9 | +2.5 |

*Value for $SiO_2$-$ZrO_2$ catalyst minus value for $SiO_2$-$Al_2O_3$ at the same conversion.

From the above data, it will be evident that hot water treatment of the silica-zirconia hydrogel for periods in excess of 5 hours at temperatures greater than about 150° F. is necessary to achieve the desired results of increased gasoline yield at a given conversion. The extent of improvement, as will be evident, increases with the severity of the hot water treating step, i.e., the improvement realized increases with increasing temperature and duration of the treatment. As a practical matter the period of hot water treatment generally does not exceed more than 72 hours. Also, since the hot water treating step is carried out at substantially atmospheric pressure, the temperature generally is not in excess of about 220° F.

Another series of silica-zirconia catalyst (Examples 7, 14, and 15) were prepared in a manner analogous to that used in the preparation of the catalyst of Example 1. The only variable was the pH at which the hydrogel was prepared and hot water treated. These catalysts, after steam treatment for 10 hours in 100 percent steam at 1200° F. and 15 p.s.i.g., were tested in the CAT-C test. The results obtained are all within a useful range as shown in Table VI below:

Table VI
EFFECT OF pH OF GELATION AND HOT WATER TREATMENT

| Example | pH of Preparation and Hot Water Treatment | Conversion, Vol. Percent | Advantage over Silica-Alumina in Vol. Percent Gasoline |
|---|---|---|---|
| 14 | 5.2 | 42.8 | +2.5 |
| 7 | 3.6 | 46.8 | +1.8 |
| 15 | 2.1 | 44.8 | +0.3 |

All of the above illustrative catalysts had a zirconia content of about 10 percent by weight. In order to show the effect of variation in zirconia content a series of silica-zirconia catalysts (Examples 7, 16 and 17) were prepared following the procedure of Example 1 except for variation in the content of $ZrO_2$. The resulting catalysts, after steam treatment for 10 hours in 100 percent steam at 1200° F. and 15 p.s.i.g., were tested in the CAT-C test. The results obtained are shown in Table VII below:

Table VII
EFFECT OF ZIRCONIA CONTENT

| Example | Percent $ZrO_2$ | Conv., Vol. Percent | Difference from $SiO_2$-$Al_2O_3$ 10# Gasoline, Vol. Percent |
|---|---|---|---|
| 16 | 5.4 | 38.8 | +0.8 |
| 7 | 10.5 | 46.8 | +1.8 |
| 17 | 15.9 | 45.0 | +0.9 |

Figure 2:
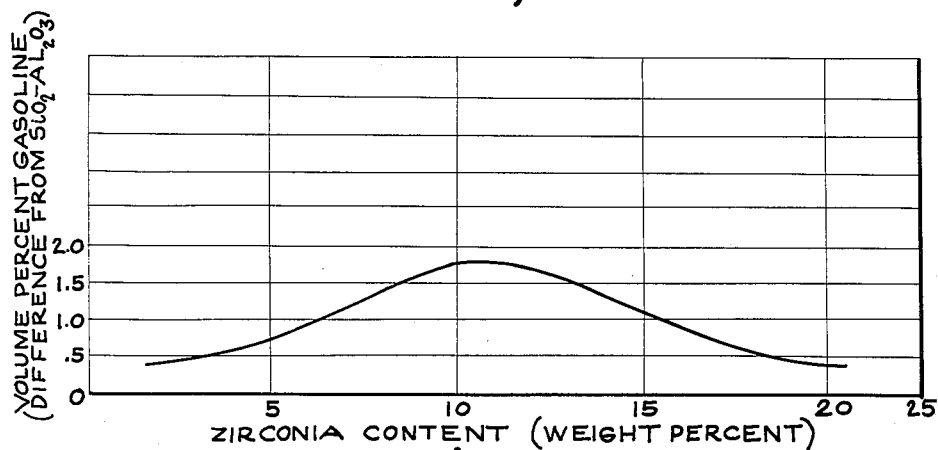

From the above data, and particularly from FIGURE 2 of the drawing wherein the improvement in volume percent of gasoline obtained is plotted against the zirconia content, it will be evident that the catalysts of the invention are desirably characterized by a zirconia content of between about 2 and about 20 and particularly between about 5 and about 15 weight percent.

Another pair of silica-zirconia catalysts (Examples 18 and 19) was prepared to show the distinction between hot water treatment and steam aging of silica-zirconia hydrogels, under conditions such that drying does not occur during the aging step.

EXAMPLE 18

In this example, the following reactants were employed:

Solution A consisting of 2800 cc. of diluted "N" brand sodium silicate containing 0.193 gram $SiO_2$/cc.

Solution B which was prepared by adding 1200 cc. of $Zr(SO_4)_2.4H_2O$ solution containing 0.05 gram $ZrO_2$/cc. and 249 cc. of $H_2SO_4$ (50 weight percent aqueous solution) to 5780 cc. of water.

Solutions A and B were mixed with rapid agitation. The resulting hydrosol had a pH of 3.6. Gelation to a firm hydrogel occurred in about 4-5 hours at a room temperature of about 80° F.

The resulting firm hydrogel was cut into cubes and heated under high humidity conditions with steam for 2 hours utilizing a dry bulb temperature of 220° F. and a wet bulb temperature of 200° F. so that negligible loss of water from the hydrogel occurred.

The hydrogel was then base-exchanged, washed, dried and calcined as in Example 1.

EXAMPLE 19

A silica-zirconia catalyst was prepared in a manner identical with that of Example 18 except that the hydrogel after treatment with steam under the specified high humidity conditions was dried in air at 240° F. and thereafter the dried hydrogel was base-exchanged, washed, dried and calcined as in Example 1.

The differences between the catalytic cracking characteristics of the above catalysts of Examples 18 and 19 and silica-alumina catalysts at the same conversion upon testing in the CAT-C test described hereinabove after steaming the catalyst samples at conditions corresponding to 10 hours in 100 percent steam at 1200° F. and 15 p.s.i.g. are shown in Table VIII below.

Table VIII

| Example | Aging: 220° F. Dry Bulb; 200° F. Wet Bulb | Dry Before Base Exchange | Conversion, Vol. percent | Difference from $SiO_2$-$Al_2O_3$* Gasoline, Vol. percent |
|---|---|---|---|---|
| 18 | Yes | No | 43.9 | −0.1 |
| 19 | Yes | Yes | 44.1 | −0.1 |

*Value for $SiO_2$-$ZrO_2$ catalyst minus value for $SiO_2$-$Al_2O_3$ at same level of conversion.

It will be evident from the above cracking results that the catalysts of Examples 18 and 19 are essentially equivalent to each other and are much inferior to catalysts prepared in accordance with the method of the invention. Thus, it will be seen from a comparison with the catalyst of Example 13, which had been subjected to equivalent steaming conditions that the catalysts of Examples 18 and 19 had much lower activity. The latter catalysts further showed much poorer selectivity than the catalyst of Example 13, yielding less gasoline and more coke.

The following example illustrates the preparation of a silica-zirconia gel, containing 10 percent by weight of zirconia, by interaction of zirconyl chloride and tetraethyl ortho silicate.

EXAMPLE 20

The following solutions were reacted:

Solution A consisting of 652 cc. of tetraethyl ortho silicate containing 0.27 gram $SiO_2$/cc.

Solution B consisting of 108.6 grams of $ZrOCl_2.8H_2O$ dissolved in 1642 cc. of ethyl alcohol.

Solution A was added to Solution B with rapid mechanical agitation. The resulting sol had a pH of 2.0 and gelled on standing for several days.

The resulting gel was cut into cubes and heat treated in water for 24 hours at 110° F. The hot water treated gel was then base-exchanged with a 2 weight percent aqueous solution of ammonium chloride for 24 hours, water washed free of chloride ion, dried for 16 hours at 270–280° F. and calcined at 1000° F. for 16 hours.

The following example illustrates the preparation of a silica-zirconia gel by reaction of sodium silicate with an aqueous hydrochloric acid solution of zirconyl chloride.

EXAMPLE 21

The following solutions were reacted:

Solution A consisting of 700 cc. of diluted "N" brand silicate containing 0.193 gram $SiO_2$/cc.

Solution B prepared by adding 300 cc. of $ZrOCl_2.8H_2O$ solution containing 0.05 gram $ZrO_2$/cc. and 82 cc. of hydrochloric acid (37.3 weight percent aqueous solution) to 1444.5 cc. of water.

Solution A was added to Solution B while agitating vigorously. The formed hydrosol having a pH of 3.7 gelled in 4–5 hours while standing at 78° F. The gel, after standing for a total of 24 hours at 78° F., was then cubed and heat treated in water for 24 hours at 175° F. The resulting hot water treated hydrogel was then base-exchanged by contacting with a 2 weight percent aqueous solution of ammonium chloride involving three 2-hour treatments and one overnight treatment, employing approximately one volume of ammonium chloride solution per volume of gel for each treatment. The exchanged gel was washed free of chloride ion, dried 16 hours at 270–280° F. and finally calcined.

It is to be understood that the above description is merely illustrative of preferred embodiments of the invention of which many variations may be made by those skilled in the art without departing from the spirit thereof.

We claim:

1. A process for preparing a catalytic composite of silica and zirconia which comprises reacting a water-soluble zirconium compound and a silica selected from the group consisting of an alkali metal silicate and an organic silicate ester to effect formation of a gelable sol consisting essentially of silica and zirconia characterized by a pH of less than 6 and a zirconia content, on a dry solids basis, of between about 2 and about 20 percent by weight, permitting the said sol to set forming a silica-zirconia gel, contacting said gel with liquid water at a temperature in the approximate range of 150 to 220° F. for a period of about 5 to about 72 hours under conditions of substantially atmospheric pressure, removing zeolitic impurities from the hot water treated gel, water washing the gel free of soluble matter, drying and calcining.

2. A process for preparing a catalytic composite of silica and zirconia which comprises reacting a water-soluble zirconium compound and a silicate selected from the group consisting of an alkali metal silicate and an organic silicate ester to effect formation of a gelable sol consisting essentially of silica and zirconia characterized by a pH of less than 5 and a zirconia content, on a dry solids basis, of between about 5 and about 15 percent by weight, permitting the said sol to set forming a silica-zirconia gel, contacting said gel with liquid water at a temperature in the approximate range of 175 to 220° F. for a period of about 12 to about 72 hours under conditions of substantially atmospheric pressure, removing zeolitic impurities from the hot water treated gel, water washing the gel free of soluble matter, drying and calcining.

3. A process for preparing a catalytic composite of silica and zirconia which comprises reacting a water-soluble zirconium compound and an organic silicate ester to effect formation of a gelable sol consisting essentially of silica and zirconia characterized by a pH of less than 6 and a zirconia content, on a dry solids basis, of between about 2 and about 20 percent by weight, permitting the said sol to set forming a silica-zirconia gel, contacting said gel with liquid water at a temperature in the approximate range of 175 to 220° F. for a period of about 5 to about 72 hours under conditions of substantially atmospheric pressure, removing zeolitic impurities from the hot water treated gel, water washing the gel free of soluble matter, drying and calcining.

4. A process for preparing a catalytic composite of silica and zirconia which comprises reacting a water-soluble zirconium compound and ethyl ortho silicate to effect formation of a gelable sol consisting essentially of silica and zirconia characterized by a pH of less than 5 and a zirconia content, on a dry solids basis, of between about 5 and about 15 percent by weight, permitting the said sol to set forming a silica-zirconia gel, contacting said gel with liquid water at a temperature within the approximate range of 175 to 220° F. for a period of about 12 to about 72 hours under conditions of substantially atmospheric pressure, removing zeolitic impurities from the hot water treated gel, water washing the gel free of soluble matter, drying and calcining.

5. A process for preparing a catalytic composite of silica and zirconia which comprises reacting in aqueous solution, a water-soluble zirconium compound and an alkali metal silicate to effect formation of a gelable hydrosol consisting essentially of silica and zirconia characterized by a pH of less than 6 and a zirconia content, on a dry solids basis, of between about 2 and about 20 percent by weight, permitting the said hydrosol to set forming a silica-zirconia hydrogel, contacting said hydrogel with liquid water at a temperature within the approximate range of 150 to 220° F. for a period of about 5 to about 72 hours under conditions of substantially atmospheric pressure, removing zeolitic impurities from the hot water treated hydrogel, water washing the hydrogel free of soluble matter, drying and calcining.

6. A process for preparing a catalytic composite of silica and zirconia which comprises reacting in aqueous solution, a water-soluble zirconium salt of a mineral acid and sodium silicate to effect formation of a gelable hydrosol consisting essentially of silica and zirconia characterized by a pH of less than 6 and a zirconia content, on a dry solids basis, of between about 2 and about 20 percent by weight, permitting the said hydrosol to set forming a silica-zirconia hydrogel, contacting said hydrogel with liquid water at a temperature in the approximate range of 150 to 220° F. for a period of about 5 to about 72 hours under conditions of substantially atmospheric pressure, removing zeolitic impurities from the hot water treated hydrogel, water washing the hydrogel free of soluble matter, drying and calcining.

7. A process for preparing a catalytic composite of silica and zirconia which comprises reacting in aqueous solution, zirconium sulfate and sodium silicate to effect formation of a gelable hydrosol consisting essentially of silica and zirconia characterized by a pH of less than 5 and a zirconia content, on a dry solids basis, of between about 5 and about 15 percent by weight, permitting the said hydrosol to set forming a silica-zirconia hydrogel, contacting said hydrogel with liquid water at a temperature in the approximate range of 175 to 220° F. for a period of about 12 to about 72 hours under conditions of substantially atmospheric pressure, removing zeolitic impurities from the hot water treated hydrogel, water washing the hydrogel free of soluble matter, drying and calcining.

8. A process for preparing a catalytic composite of silica and zirconia which comprises reacting an aqueous mineral acid solution of a water-soluble zirconium salt and an alkali metal silicate to effect formation of a gelable hydrosol consisting essentially of silica and zirconia characterized by a pH within the approximate range of 1.5 to 5 and a zirconia content, on a dry solids basis, of between about 2 and about 20 percent by weight, permitting the said hydrosol to set forming a silica-zirconia hydrogel, contacting said hydrogel with liquid water at a temperature in the approximate range of 150 to 220° F. for a period of about 5 to about 72 hours under conditions of substantially atmospheric pressure, removing zeolitic impurities from the hot water treated hydrogel, water washing the hydrogel free of soluble matter, drying and calcining.

9. A process for preparing a catalytic composite of silica and zirconia which comprises reacting an aqueous sulfuric acid solution of zirconium sulfate and sodium silicate to effect formation of a gelable hydrosol consisting essentially of silica and zirconia characterized by a pH of less than 6 and a zirconia content, on a dry solids basis, of between about 5 and about 15 percent by weight, permitting the said hydrosol to set forming a silica-zirconia hydrogel, contacting said hydrogel with liquid water at a temperature in the approximate range of 175 to 220° F., for a period of about 12 to about 72 hours under conditions of substantially atmospheric pressure, base exchanging to remove zeolitic impurities from the hot water treated hydrogel, water washing the hydrogel free of soluble matter, drying and calcining.

10. A hydrocarbon conversion catalyst consisting essentially of silica and zirconia having a zirconia content of between about 2 and about 20 percent by weight prepared by reacting a water-soluble zirconium compound and a silicate selected from the group consisting of an alkali metal silicate and an organic silicate ester to effect formation of a gelable sol consisting essentially of silica and zirconia characterized by a pH of less than 6 and a zirconia content, on a dry solids basis, of between about 2 and about 20 percent by weight, permitting the said sol to set forming a silica-zirconia gel, contacting said gel with liquid water at a temperature in the approximate range of 150 to 220° F. for a period of about 5 to about 72 hours under conditions of substantially atmospheric pressure, removing zeolitic impurities from the hot water treated gel, water washing the gel free of soluble matter, drying and calcining.

References Cited in the file of this patent

UNITED STATES PATENTS

| | | |
|---|---|---|
| 2,289,918 | Lee et al. | July 14, 1942 |
| 2,396,758 | Stratford | Mar. 19, 1946 |
| 2,456,721 | Milliken et al. | Dec. 21, 1948 |
| 2,472,832 | Hunter et al. | June 14, 1949 |
| 2,595,056 | Connolly | Apr. 29, 1952 |
| 2,597,889 | Milliken et al. | May 27, 1952 |
| 2,680,100 | Ahlberg et al. | June 1, 1954 |
| 2,853,454 | Mills | Sept. 23, 1958 |
| 2,867,578 | Hirshler | Jan. 6, 1959 |
| 3,015,620 | Plank et al. | Jan. 2, 1962 |